(12) United States Patent
Hara

(10) Patent No.: US 8,687,092 B2
(45) Date of Patent: Apr. 1, 2014

(54) IMAGING DEVICE THAT DISPLAYS PREVIOUS SETTING INFORMATION WHEN AN IMAGE CAPTURE MODE IS RELEASED AND THEN RE-ENTERED

(75) Inventor: Shinya Hara, Yokohama (JP)

(73) Assignee: Nikon Corporation, Tokyo (JP)

( * ) Notice: Subject to any disclaimer, the term of this patent is extended or adjusted under 35 U.S.C. 154(b) by 409 days.

(21) Appl. No.: 12/972,817

(22) Filed: Dec. 20, 2010

(65) Prior Publication Data

US 2011/0273606 A1 Nov. 10, 2011

(30) Foreign Application Priority Data

Dec. 25, 2009 (JP) ................................. 2009-293680

(51) Int. Cl.
*H04N 5/76* (2006.01)
(52) U.S. Cl.
USPC ..................................................... 348/231.6
(58) Field of Classification Search
USPC ..................................................... 348/231.9
See application file for complete search history.

(56) References Cited

U.S. PATENT DOCUMENTS

| 5,721,989 | A * | 2/1998 | Kitazawa et al. | 396/280 |
| 6,778,770 | B1 * | 8/2004 | Cazier et al. | 396/77 |
| 7,973,832 | B2 | 7/2011 | Miyanishi | |
| 2005/0168611 | A1 * | 8/2005 | Yamaya | 348/333.01 |
| 2006/0280495 | A1 * | 12/2006 | Okumura | 396/282 |
| 2009/0066807 | A1 | 3/2009 | Miyanishi | |
| 2012/0019704 | A1 * | 1/2012 | Levey | 348/335 |

FOREIGN PATENT DOCUMENTS

| JP | A-10-42175 | 2/1998 |
| JP | A-10-42187 | 2/1998 |
| JP | A-2007-134754 | 5/2007 |
| JP | A-2007-201693 | 8/2007 |
| JP | A-2009-71433 | 4/2009 |

OTHER PUBLICATIONS

Japanese Office Action dated Jan. 24, 2012 issued in Japanese Patent Application No. 2009-293680 (with translation).

* cited by examiner

*Primary Examiner* — Gary C Vieaux
(74) *Attorney, Agent, or Firm* — Oliff PLC

(57) ABSTRACT

An imaging device provided with an imaging unit for imaging object light, and a display unit for displaying an image, comprises: a storage unit that stores at least one of setting information regarding image capture performed in a predetermined image capture mode in which a predetermined image capture condition can be set and setting information regarding functions other than the image capture; a determination unit that determines whether a predetermined condition is satisfied when the predetermined image capture mode is released and then the imaging device re-enters the predetermined image capture mode; and a control unit that controls whether to cause the display unit to display presence display, which indicates presence or absence of the setting information stored in the storage unit, based on a determination result of the determination unit.

7 Claims, 19 Drawing Sheets

IMAGING DEVICE THAT DISPLAYS PREVIOUS SETTING INFORMATION WHEN AN IMAGE CAPTURE MODE IS RELEASED AND THEN RE-ENTERED

CROSS-REFERENCE TO RELATED APPLICATIONS

The disclosure of the following priority application is incorporated herein by reference:

Japanese Patent Application No. 2009-293680 filed on Dec. 25, 2009.

TECHNICAL FIELD

The present invention relates to an imaging device.

BACKGROUND ART

To enable even a novice who is unaccustomed to cameras to set appropriate image capture conditions, there has been proposed a camera having a guidance mode in which the camera displays a first layer of guidance display on a display unit such as an LCD, allows a user to select one of a plurality of items such as "I'd like a bright photograph of an object" or "I'd like to photograph an object against a backlight" in the first layer of the guidance display, displays a second layer of guidance display, which is developed as a lower layer of the selected item in the first layer of the guidance display, on the display unit, and allows the user to select one of a plurality of items such as "forcible flash operation" in the second layer of the guidance display, and thereby sets image capture conditions based on the selected items in the first layer of the guidance display and the second layer of the guidance display (for example, refer to Patent Literature 1).

CITATION LIST

Patent Literature

Japanese Unexamined Patent Application Publication No. 2007-201693

SUMMARY OF INVENTION

Technical Problem

However, the image capture conditions set in the guidance mode in the camera disclosed in JP-A-2007-201693 are initialized when the power of the camera is turned off. Therefore, after the power of the camera is turned on, even when performing an image capture operation again under the image capture conditions set in the guidance mode before the power of the camera is turned off, it is necessary to set the same image capture conditions in the guidance mode again.

An object of the present invention is to provide an imaging device capable of easily and quickly reading predetermined image capture conditions, which have been previously set in a predetermined image capture mode, when performing an image capture operation on a subsequent occasion in the predetermined image capture mode.

Solution to Problem

An imaging device of the present invention is an imaging device provided with an imaging unit for imaging object light, and a display unit for displaying an image, and comprises: a storage unit that stores at least one of setting information regarding image capture performed in a predetermined image capture mode in which a predetermined image capture condition can be set and setting information regarding functions other than the image capture; a determination unit that determines whether a predetermined condition is satisfied when the predetermined image capture mode is released and then the imaging device re-enters the predetermined image capture mode; and a control unit that controls whether to cause the display unit to display presence display, which indicates presence or absence of the setting information stored in the storage unit, based on a determination result of the determination unit.

Advantageous Effects of Invention

According to the imaging device of the present invention, it is possible to know the presence or absence of predetermined image capture conditions previously set in a predetermined image capture mode. Consequently, as one option, a user can read and use the previously set image capture conditions when the user performs an image capture operation on a subsequent occasion in the predetermined image capture mode.

DESCRIPTION OF EMBODIMENTS

Figure 1:
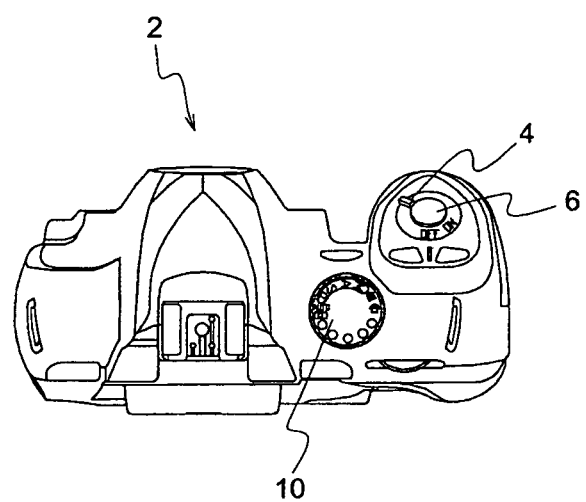
FIG. 1 is a top surface view illustrating the external appearance of a camera according to the embodiment.
Figure 2:
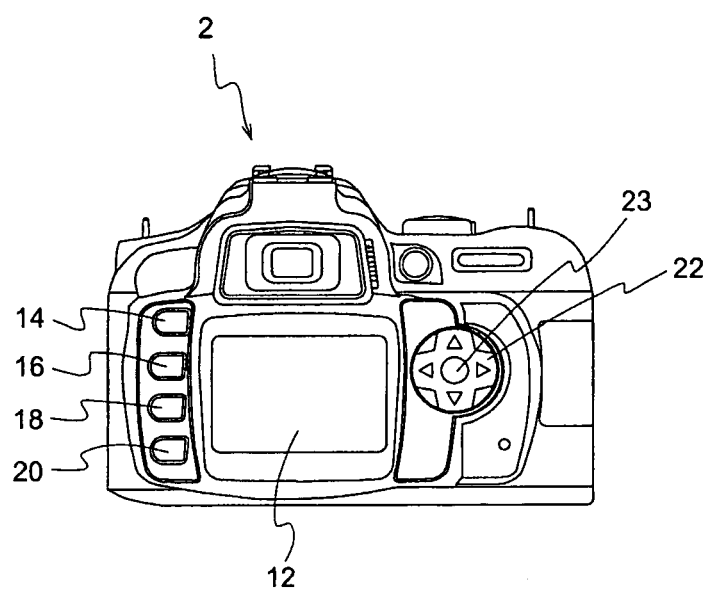
FIG. 2 is a rear view illustrating the external appearance of the camera according to the embodiment.

Hereinafter, a camera as an imaging device according to an embodiment of the present invention will be described with reference to the accompanying drawings. FIGS. 1 and 2 are diagrams illustrating the external appearance of a camera 2 according to a first embodiment, wherein FIG. 1 is a top surface view of the camera 2 and FIG. 2 is a rear view of the camera 2. As illustrated in FIG. 1, the top surface of the camera 2 is provided with a power switch 4 for turning on and off the power of the camera 2, a release switch 6 for commanding an image capture operation and the like, and a mode dial 10 for switching to a guide mode and various image capture modes.

Furthermore, as illustrated in FIG. 2, the rear surface of the camera 2 is provided with a rear liquid crystal panel 12 for reproducing and displaying an image and the like, a reproduction button 14 for commanding the reproduction and display of an image recorded on a recording medium 30 (see FIG. 4), a menu button 16 for commanding the display of a menu screen on which various settings of the camera 2 are performed, a reduction button 18 for commanding the reduced display of an image reproduced and displayed on the rear liquid crystal panel 12, an enlargement button 20 for commanding the enlarged display of the image reproduced and displayed on the rear liquid crystal panel 12, a cross operation key 22 for selecting a menu item and the like or moving a cursor, and an OK (decision) button 23 for performing a selection decision operation for various selection items.

Figure 3:
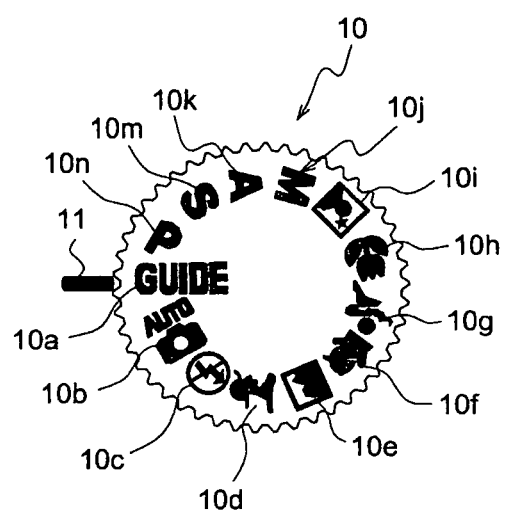
FIG. 3 is a diagram illustrating the configuration of a mode dial according to the embodiment.

FIG. 3 is a diagram illustrating the configuration of the mode dial 10. As illustrated in FIG. 3, the mode dial 10 is configured to be turned clockwise or counterclockwise by a user to select an arbitrary operation position (in FIG. 3, an operation position 10$a$) facing the position of an index 11. That is, as illustrated in FIG. 3, when the operation position 10$a$ is selected, the camera 2 is set to a guide mode in which it is possible to set predetermined image capture conditions. In the guide mode, the camera 2 performs a function of displaying a screen on the rear liquid crystal panel 12. On the screen, it is possible to select a setting regarding image capture, a setting regarding reproduction and deletion, and a setting regarding the camera 2. Herein, the guide mode is one of the setting input modes for encouraging a user to select operations while the camera provides the user with guidance display (displays a guidance menu) so that even a novice unaccustomed to a camera operation can easily operate the camera in relation to various settings of the camera regarding the image capture, the reproduction and the deletion, and the like. In the guide mode, a user can select and set various conditions step by step (sequentially) using setting menus in each setting step that are formed in a hierarchical structure. When the user selects and sets various conditions, setting menus in each layer are sequentially displayed on a display unit. The user performs setting input based on the content of each setting menu that is sequentially displayed on the display unit, thereby setting the camera 2 to a desired state (image capture conditions, reproduction and deletion conditions, and other setting states of the camera). Methods of utilizing the guide mode will be described in detail below.

Furthermore, when an operation position 10$b$ is selected, the camera 2 automatically sets image capture conditions and the like. When an operation position 10$c$ is selected to an automatic image capture mode in which an image capture operation is performed, the camera 2 is set to a flash prohibition image capture mode in which non-flash image capture is performed. When an operation position 10$d$ is selected, the camera 2 is set to a portrait image capture mode in which an image capture condition optimal for image capture of a person is set. When an operation position 10$e$ is selected, the camera 2 is set to a landscape image capture mode in which an image capture condition optimal for image capture of a landscape is set. When an operation position 10$f$ is selected, the camera 2 is set to a children snap image capture mode in which an image capture condition optimal for image capture of a child is set. When an operation position 10$g$ is selected, the camera 2 is set to a sports image capture mode in which an image capture condition optimal for image capture the momentary movement of sports and the like is set. When an operation position 10$h$ is selected, the camera 2 is set to a close-up image capture mode in which an image capture condition optimal for taking a close-up picture of a flowering plant or an insect is set. When an operation position 10$i$ is selected, the camera 2 is set to a night view portrait image capture mode in which an image capture condition optimal for image capture of a person in a night view or evening view background is set. When an operation position 10$j$ is selected, the camera 2 is set to a manual exposure mode in which a shutter speed and an aperture value are manually set. When an operation position 10$k$ is selected, the camera 2 is set to an aperture priority exposure mode in which the aperture value is manually set. When an operation position 10$m$ is selected, the camera 2 is set to a shutter priority exposure mode in which the shutter speed is manually set. When an operation position 10$n$ is selected, the camera 2 is set to a program exposure mode in which the camera 2 automatically sets the shutter speed and a diaphragm.

Figure 4:
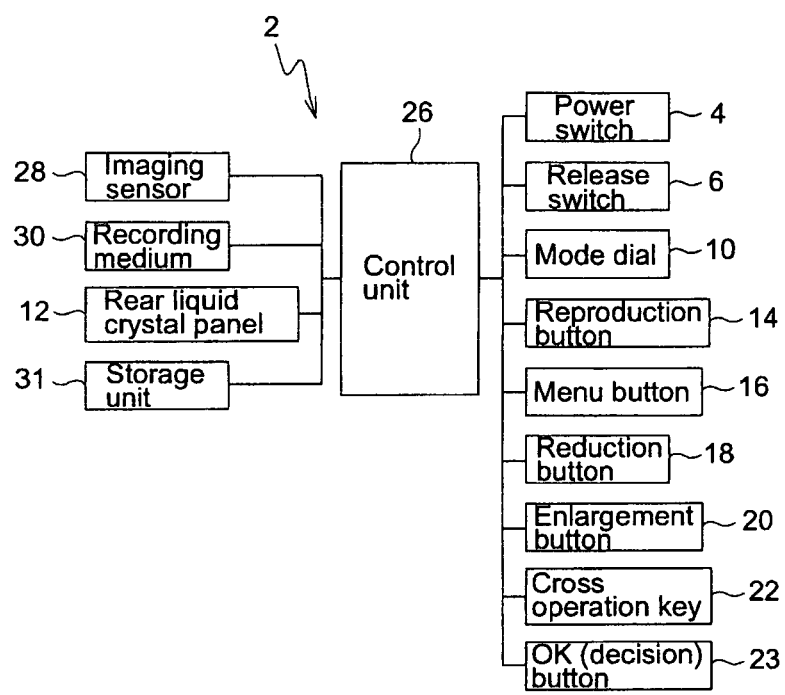
FIG. 4 is a block diagram illustrating a system configuration of the camera according to the embodiment.

FIG. 4 is a block diagram illustrating the system configuration of the camera 2 according to the first embodiment. As illustrated in FIG. 4, the camera 2 includes a control unit 26, an imaging sensor 28, the recording medium 30, the rear liquid crystal panel 12, a storage unit 31, the power switch 4, the release switch 6, the mode dial 10, the reproduction button 14, the menu button 16, the reduction button 18, the enlargement button 20, the cross operation key 22, and the OK (decision) button 23.

The control unit 26 includes a CPU and the like that executes overall control of each component of the camera 2. In the embodiment, the control unit 26 controls whether to display "presence display" (in the embodiment, icon display indicating presence) on the rear liquid crystal panel 12. The "presence display", which is set in the guide mode described below, indicates the presence or absence of setting information, which is stored in the storage unit 31, regarding the image capture, the reproduction, and the camera 2. It is noted that the setting information regarding the image capture, the reproduction, and the camera 2 will be described later.

In addition, in the present embodiment, "presence display" functions also as "display for reading" for commanding the reading of the setting information written in the storage unit 31. Thus, if the user selects the presence display, the camera reads the corresponding setting information to display the read setting information on the rear liquid crystal panel 12 as setting information of the camera. In the embodiment, in the following description, the "presence display" will be described to be equal to "display for reading" (i.e., the "presence display" and the "display for reading" are interchangeable). However, the present invention is not limited thereby. For example, the presence display and the display for reading may be displayed separately (as separate icon displays) on the display unit.

The imaging sensor 28 includes a CCD, a CMOS and the like for imaging object light from an object, which has passed through an image capture lens (not shown). The recording medium 30 has portability, that is, is detachably mounted to a recording medium insertion port (not shown) provided in the camera 2. An image generated based on an imaging signal output from the imaging sensor 28 is recorded on the recording medium 30 together with other information regarding the image such as an image capture date, an aperture value or a shutter speed.

The rear liquid crystal panel 12 displays a through image based on the imaging signal output from the imaging sensor 28, an image recorded on the recording medium 30, information regarding the image recorded on the recording medium 30, a menu screen and the like. The storage unit 31 stores the setting information regarding the image capture, the reproduction, and the camera 2 performed in the guide mode as described below.

Figure 5:
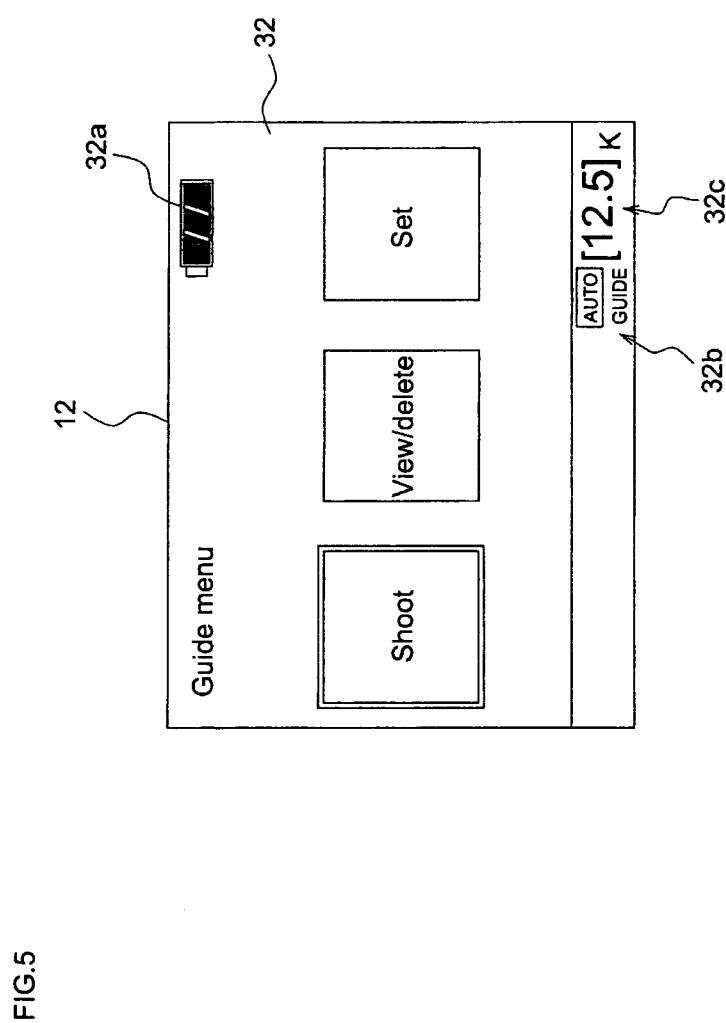
FIG. 5 is a diagram illustrating a display example of a rear liquid crystal panel according to the embodiment.

Next, a guide mode corresponding to the operation position 10a of the mode dial 10 according to the embodiment will be described. If the operation position 10a is selected by the user, the control unit 26 shifts to the guide mode and displays a screen 32 on the rear liquid crystal panel 12, as illustrated in FIG. 5.

By using the cross operation key 22 and the like, the user selects "shoot" when performing a setting regarding image capture, "view/delete" when performing a setting regarding reproduction or deletion, and "set" when performing a setting regarding the camera 2. In addition, in FIG. 5, "shoot" is selected, and a remaining capacity mark 32a indicating the remaining capacity of a battery, an image capture mode mark 32b indicating a currently set image capture mode, and the number 32c of recordable frames with respect to the remaining capacity of the recording medium 30, and the like are further displayed.

Figure 6:
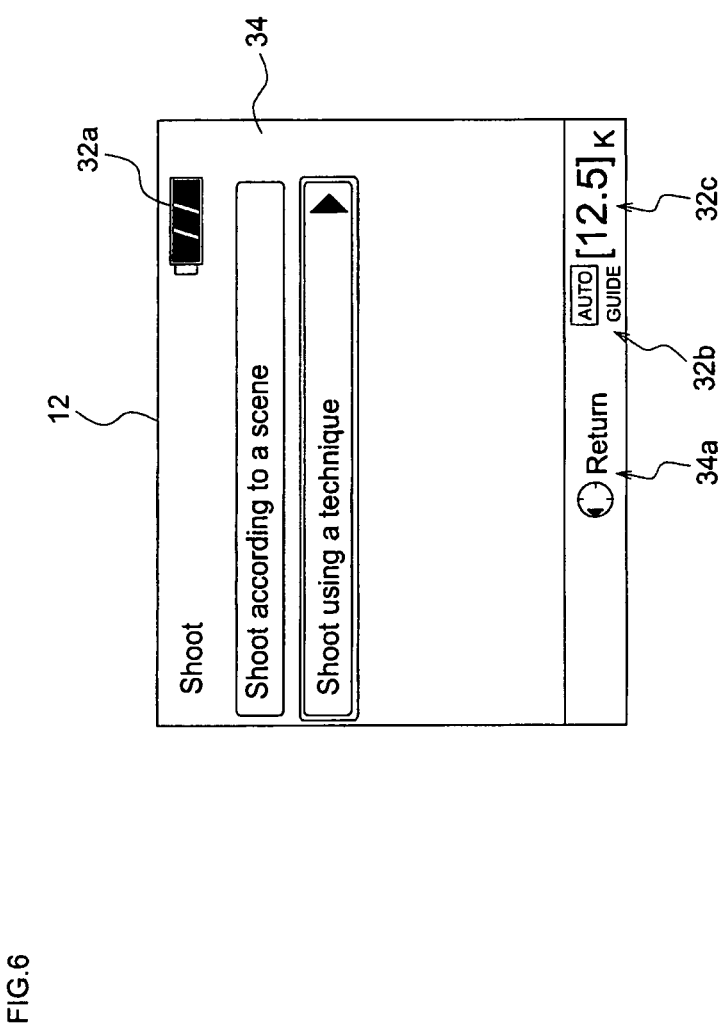
FIG. 6 is a diagram illustrating a display example of the rear liquid crystal panel according to the embodiment.

If "shoot" is selected and the OK (decision) button 23 is pressed by the user, the control unit 26 displays a screen 34 for performing the setting (setting input in the next layer) regarding the image capture on the rear liquid crystal panel 12 as illustrated in FIG. 6. The user selects "shoot according to a scene" when setting image capture conditions according to the scene such as a person or a landscape, or "shoot using a technique" when manually setting the shutter speed, the diaphragm and the like by using up and down buttons and the like of the cross operation key 22. In addition, in FIG. 6, "shoot using a technique" is selected, and a "return mark" 34a indicating a return to the previous screen 32 (see FIG. 5) if a left button of the cross operation key 22 is pressed is also displayed.

Figure 7:
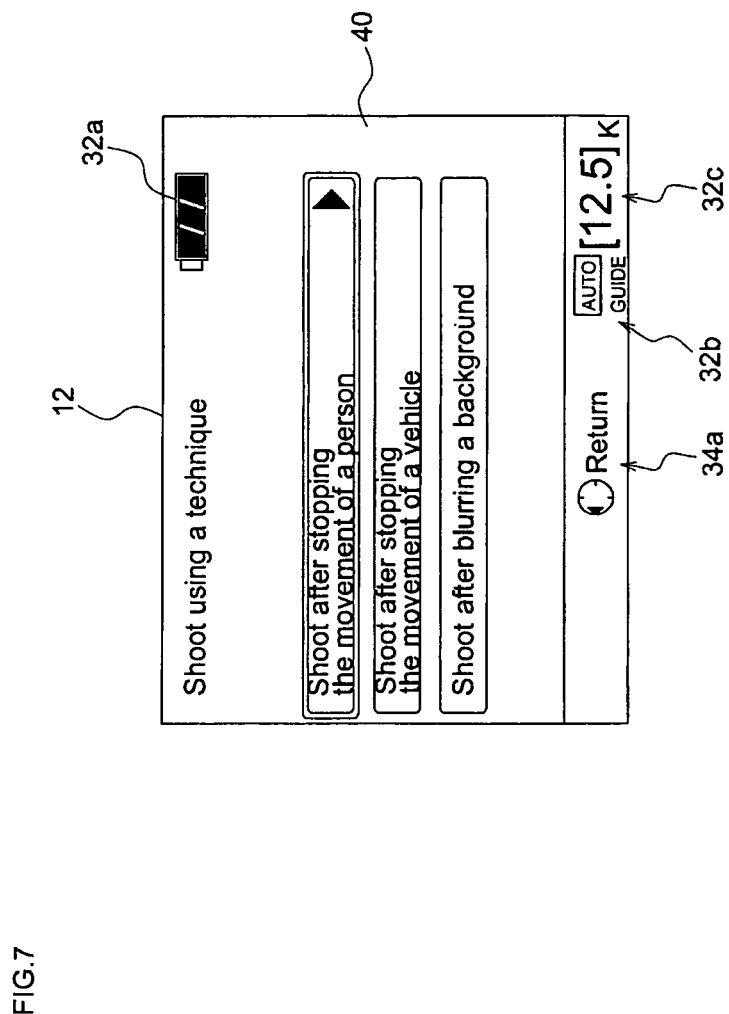
FIG. 7 is a diagram illustrating a display example of the rear liquid crystal panel according to the embodiment.
Figure 8:
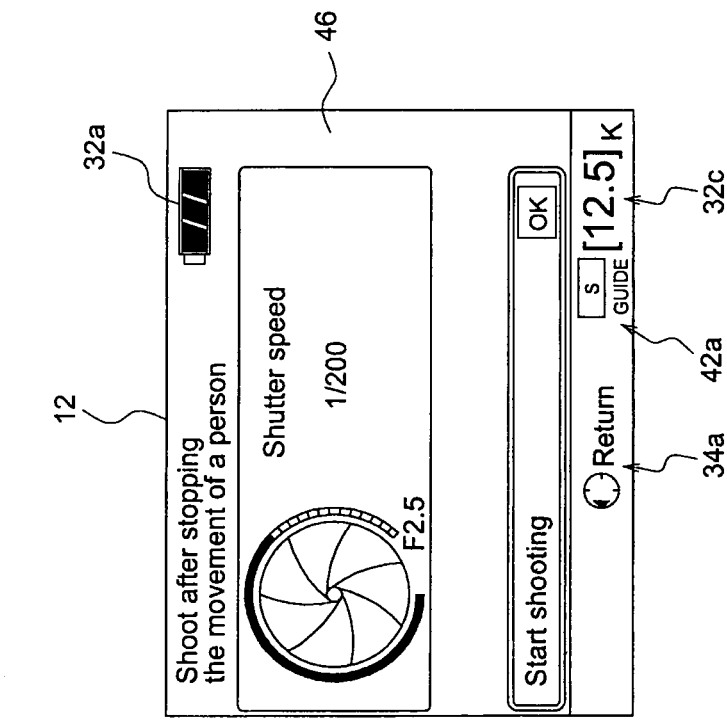
FIG. 8 is a diagram illustrating a display example of the rear liquid crystal panel according to the embodiment.

Next, if "shoot using a technique" is selected and the OK (decision) button 23 is pressed by the user, the control unit 26 displays a screen 40 for performing additional setting (additional setting input in the next layer) regarding the image capture when performing "shoot using a technique" on the rear liquid crystal panel 12 as illustrated in FIG. 7. Next, if "shoot after stopping the movement of a person" is selected and the OK (decision) button 23 is pressed by the user, the control unit 26 displays a screen (not shown) for providing a description including advice information when performing "shoot after stopping the movement of a person" on the rear liquid crystal panel 12. Then, if the OK (decision) button 23 is pressed by the user, the control unit 26 displays a screen (not shown, additional setting input in the next layer) for setting the shutter speed, on the rear liquid crystal panel 12. Then, if the shutter speed is set using the up and down buttons and the like of the cross operation key 22, and the OK (decision) button 23 is pressed by the user, the control unit 26 displays a screen 46 for displaying the set shutter speed and the like on the rear liquid crystal panel 12 as illustrated in FIG. 8. When performing an image capture operation at the set shutter speed, the user selects "start the image capture" on the screen 46 and presses the OK (decision) button 23.

In addition, in the case of selecting "shoot according to a scene" on the screen 34 illustrated in FIG. 6, even when "shoot after stopping the movement of a vehicle" or "shoot after blurring the background" is selected on the screen 40 illustrated in FIG. 7, the control unit 26 displays a screen on the rear liquid crystal panel 12 for performing additional settings (a setting input in the next layer), in addition to a screen for providing a description including advice information, and the like, and sets image capture conditions such as a shutter speed or an aperture value, which are suitable for an item selected by the user.

Next, a selection of "view/delete" displayed on the screen 32 illustrated in FIG. 5 will be described. If "view/delete" is selected, the control unit 26, for example, uses the rear liquid crystal panel 12 to display a screen (not shown, a setting input screen in the next layer) that displays items such as "view one image", "view plurality of images", "view by date selection", "view images by slide show" or "delete photographed images". If the item "view one image" is selected, the control unit 26 reproduces and displays the latest or the oldest image finally or initially recorded on the recording medium 30 on the rear liquid crystal panel 12. If the item "view plurality of images" is selected, the control unit 26, for example, reproduces and displays the latest or the oldest thumbnail image corresponding to four frames or nine frames on the rear liquid crystal panel 12. If the item "view by date selection" is selected, the control unit 26 displays a calendar and the like for inputting a date on the rear liquid crystal panel 12, automatically extracts an image photographed on a date selected by the user, and reproduces and displays the automatically extracted image on the rear liquid crystal panel 12. If the item "view images by slide show" is selected, the control unit 26 reproduces and displays images recorded on the recording medium 30 on the rear liquid crystal panel 12 through a slide show at a preset time interval while sequentially and automatically feeding the frames of the images to the rear liquid crystal panel 12.

If the item "delete photographed images" is selected, the control unit 26 uses the rear liquid crystal panel 12 to display a screen (not shown, a setting input screen in the next layer) on which items such as "collectively delete plurality of images", "delete image after designating date" or "delete all images" are displayed. If the item "collectively delete plurality of images" is selected, the control unit 26 deletes an image from the recording medium 30, which corresponds to the thumbnail image selected by the user from a list of thumbnail images displayed on the rear liquid crystal panel 12. If the item "delete image after designating date" is selected, the control unit 26 displays a calendar and the like for inputting a date on the rear liquid crystal panel 12 and deletes an image photographed on a date selected by the user from the recording medium 30. If the item "delete all images" is selected, the control unit 26 deletes all images recorded on the recording medium 30. In addition, before deleting an image, a message and the like for checking whether to delete the image are displayed.

Next, the selection of a "set" operation displayed on the screen 32 illustrated in FIG. 5 will be described. If "set" is selected, the control unit 26 uses the rear liquid crystal panel 12 to display a screen (not shown, a setting input screen in the next layer) on which setting items such as an "image quality mode", an "image size", "brightness of liquid crystal monitor", "area setting", "date setting", a "date display method", "setting summer time" or "power-off time" are displayed. Herein, setting items in the setting regarding the camera 2 in the guide mode are formed by extracting items with a high setting frequency, an item which can be easily set by a novice and the like from setting items regarding the normal (not in the guide mode) camera 2.

If the item "image quality mode" is selected, the control unit 26 displays the type (a setting input screen in the next layer) of selectable image quality. If the item "image size" is selected, the control unit 26 displays the type (a setting input screen in the next layer) of a selectable image size. If the item "brightness of liquid crystal monitor" is selected, the control unit 26 displays a screen (a setting input screen in the next layer) of setting brightness. If the item "area and date" is selected, the control unit 26 displays selectable items (a setting input screen in the next layer) such as "area setting", "date setting", a "date display method" or "setting of summer time". If the item "power-off time" is selected, the control unit 26 displays the type (a setting input screen in the next layer) of a selectable power-off time (a continuous time for which a normal operation mode is continued). If a desired setting value regarding a setting item is selected by the user, the control unit 26 sets the setting item based on the selected desired setting value.

In addition, as described above, even in the process of performing the setting regarding the image capture, the reproduction, the deletion or the camera 2 in the guide mode (e.g., in the state where the screens illustrated in FIGS. 6 to 8 are displayed on the rear liquid crystal panel 12), if a predetermined operation member (e.g., the menu button 16) is pressed by a user, the control unit 26 displays the screen 32 illustrated in FIG. 5 on the rear liquid crystal panel 12. Consequently, the user can modify from the beginning a setting regarding the image capture, the reproduction, the deletion or the camera 2 in the guide mode.

The control unit 26 completes the setting and the like regarding image capture or the camera 2 in the guide mode, and then displays a screen (not shown) in an image capture standby state on the rear liquid crystal panel 12. The screen displays a mark indicating whether an item has been set in the guide mode, a set shutter speed, an aperture value, an auto focus area, an image quality mode, an image size, white balance, ISO sensitivity, a light measurement mode and the like.

In the embodiment, as described above, the setting information (e.g., a shutter speed, an aperture value, an auto focus area, an image quality mode, an image size, white balance, ISO sensitivity, a light measurement mode, a time interval of a slide show and the like) set for the image capture, the reproduction and the camera 2 in the guide mode can be stored in the storage unit 31 for subsequent reading. Hereinafter, the operation of the control unit 26 when the power of the camera 2 according to the embodiment is turned off will be described with reference to the flowchart illustrated in FIG. 9.

First, when the operation position 10a of the mode dial 10 is selected, that is, when the guide mode is set, if the power switch 4 for commanding the power-off of the camera 2 is pressed by a user (step S10, Yes), the control unit 26 stores the setting information (the latest setting information) regarding the image capture, the reproduction and the camera 2 in the guide mode in the storage unit 31 as previous setting information (step S11). In the embodiment, as well as setting information changed in the guide mode, all setting information preset as a default without a change in the guide mode is also stored as the previous setting information. In addition, a configuration may be adopted in which only setting information changed in the guide mode is stored as the previous setting information.

Then, a timer is turned on (step S12) and simultaneously the power of the camera 2 is turned off (step S13). The timer is for counting a time to determine whether a predetermined time (in the embodiment, eight hours), which will be described later, has elapsed after the timer is turned on, and starts to count the time after the guide mode is released (in the embodiment, the time at which the power of the camera 2 is turned off). That is, if the power of the camera 2 is turned off, since it is not possible to set the image capture, the reproduction and the like in the guide mode even when the guide mode is set, it is regarded that the guide mode has been released and the timer starts counting.

Next, the operation of the control unit 26 during power on in the camera 2 according to the embodiment will be described with reference to the flowchart illustrated in FIG. 10.

First, if the power switch 4 for commanding power-on in the camera 2 is pressed by a user (step S20, Yes), the control unit 26 turns on the power of the camera 2 (step S21). Then, the control unit 26 determines whether the operation position 10a of the mode dial 10 has been selected, that is, whether the camera 2 has re-entered the guide mode (step S22). That is, when the operation position 10a has been already selected when the power of the camera 2 is turned on, or when other operation positions 10b to 10n have been selected when the power of the camera 2 is turned on, and then the operation position 10a is selected by the user turning the mode dial 10, the control unit 26 determines that the camera 2 has re-entered the guide mode (step S22, Yes). Meanwhile, when other operation positions 10b to 10n have been selected when the power of the camera 2 is turned on, the control unit 26 determines that the camera 2 has not re-entered the guide mode as long as the operation position 10a is not selected by the user (step S22, No).

Figure 9:
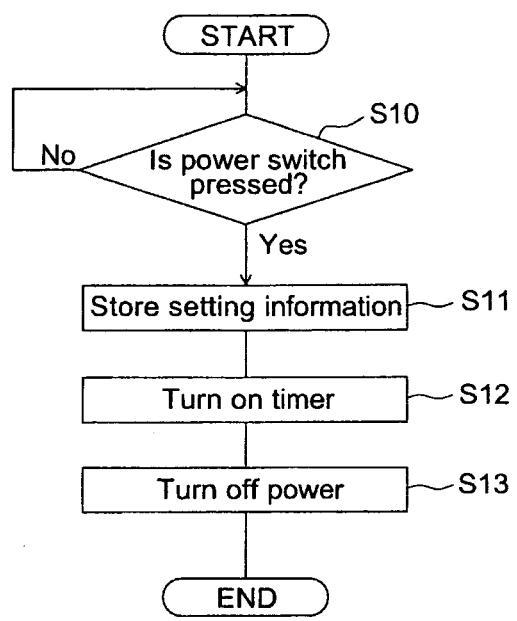
FIG. 9 is a flowchart explaining an operation during power off in the camera according to the first embodiment.

When it is determined that the camera 2 has re-entered the guide mode in step S22 (step S22, Yes), the control unit 26 determines whether the camera 2 has re-entered the guide mode within a predetermined time (eight hours in the embodiment) after the power of the camera 2 is turned off in step S13 of FIG. 9 (step S23). More specifically, the control unit 26 determines whether the time counted by the timer turned on in step S12 of FIG. 9 is within eight hours. In addition, although the predetermined time is preset and stored in the storage unit 31, the predetermined time can be changed. When changing the predetermined time, an item for changing and setting the predetermined time is added to a menu as a menu item, a menu screen is displayed on the rear liquid crystal panel 12, and then the length of the predetermined time is changed by an operation using the cross operation key 22 and the like.

Figure 11:
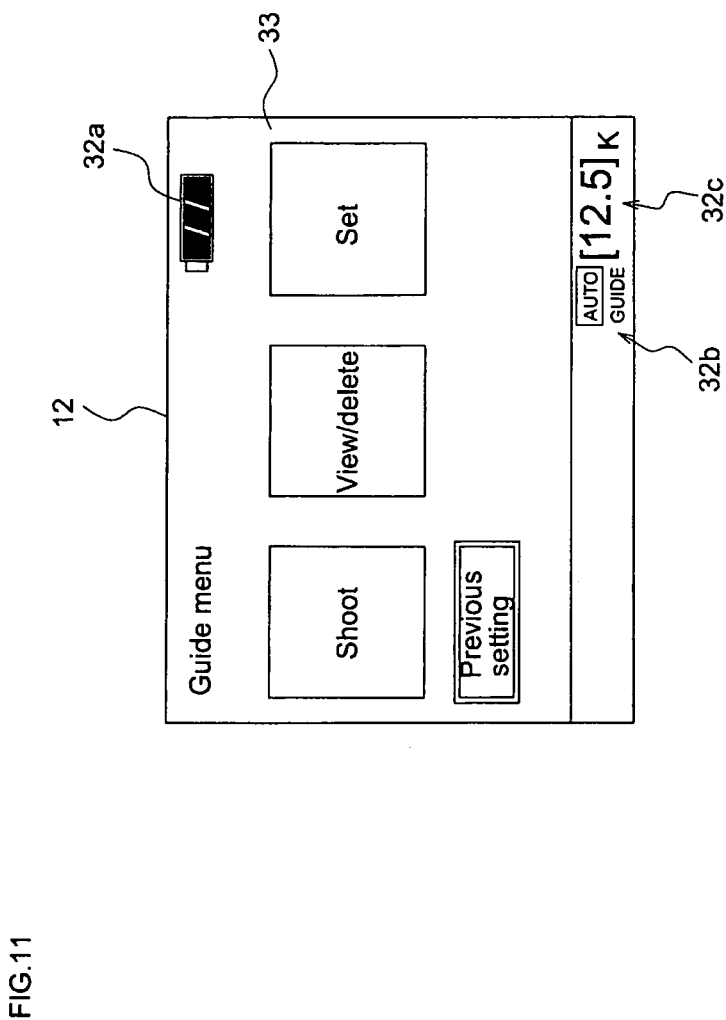
FIG. 11 is a diagram illustrating a display example of the rear liquid crystal panel according to the embodiment.

When it is determined that the camera 2 has re-entered the guide mode within eight hours in step S23 (step S23, Yes), the control unit 26 uses the rear liquid crystal panel 12 to display a screen 33, on which a "previous setting" icon is displayed as illustrated in FIG. 11, as a presence display for indicating the presence or absence of the previous setting information stored in the storage unit 31 in step S11 of FIG. 9 and as a display for reading for commanding the reading of the previous setting information (step S25). That is, since eight hours have not elapsed after the previous setting information is stored in the storage unit 31, the conditions (an object, place, weather and the like) in which an image capture operation was performed under image capture conditions based on the previous setting information are likely to be the same as the current conditions. In this regard, the control unit 26 determines that an image capture operation may be performed under image capture conditions that are the same as the image capture conditions based on the previous setting information, and displays the display for reading for commanding the reading of the previous setting information stored in the storage unit 31. In such a case, the user may select the item "previous setting" for performing the reading of the previous setting information stored in the storage unit 31 by using the cross operation key 22 and the like, in addition to "shoot", "view" and "set". In FIG. 11, the item "previous setting" is set.

Meanwhile, when it is determined that the camera 2 has not re-entered the guide mode within eight hours in step S23 (step S23, No), the control unit 26 uses the rear liquid crystal panel 12 to display a screen that does not display a presence display (display for reading for commanding the reading of the previous setting information) for indicating the presence or absence of the previous setting information stored in the storage unit 31 in step S11 of FIG. 9. In other words, the screen 32 (the screen on which the "previous setting" icon is not displayed) illustrated in FIG. 5 (step S24).

That is, since eight hours have elapsed after the previous setting information is stored in the storage unit 31, the control unit 26 determines that conditions do not exist in which an image capture operation is performed under image capture conditions based on the previous setting information, and that consequently it may be possible to set image capture conditions different from the image capture conditions based on the previous setting information. Therefore, the presence display (the display for reading for commanding the reading of the previous setting information) for indicating the presence or absence of the previous setting information stored in the storage unit 31 is not displayed. In such a case, the user selects any one of "shoot", "view/delete" and "set", and the control unit 26 performs a new setting regarding the image capture, the reproduction, the deletion or the camera 2 according to a setting operation of the user.

In addition, if it is determined that the camera 2 has not re-entered the guide mode within the predetermined time in step S23, since the setting information (setting information set after "shoot" is selected) regarding the image capture cannot be read from the storage unit 31, it is necessary to re-perform a setting regarding the image capture. However, setting information (setting information set after "view/delete" or "set" is selected) regarding the reproduction and the camera 2 is obtained by reading the previous setting information with the control unit 26 and then based on the read previous setting information for settings regarding reproduction and the camera 2. For example, when the time interval of a slide show in the guide mode is changed from 2 seconds to 5 seconds before the power of the camera 2 is turned off, the control unit 26 stores setting information indicating that the time interval of the slide show is 5 seconds in the storage unit 31 when the power of the camera 2 is turned off, and then reads the setting information from the storage unit 31 and sets the time interval of the slide show to 5 seconds when the power of the camera 2 is turned on and re-enters the guide mode. Consequently, when the user starts the slide show without any change in the guide mode, images are reproduced and displayed through the slide show at the time interval of 5 seconds, instead of 2 seconds, by sequential and automatic feeding of the image frames into the rear liquid crystal panel 12.

Furthermore, when it is determined that the camera 2 has not re-entered the guide mode within the predetermined time in step S23, the setting information regarding image capture which is stored in the storage unit 31 may be maintained in such a storage state (but, cannot be read), or may be deleted from the storage unit 31. Even when the storage state of the setting information in the storage unit 31 is maintained, if the setting information regarding image capture in the guide mode is changed and the power of the camera 2 is turned off by the user, the most recently modified setting information is overwritten into the storage unit 31 as previous setting information.

Figure 12:
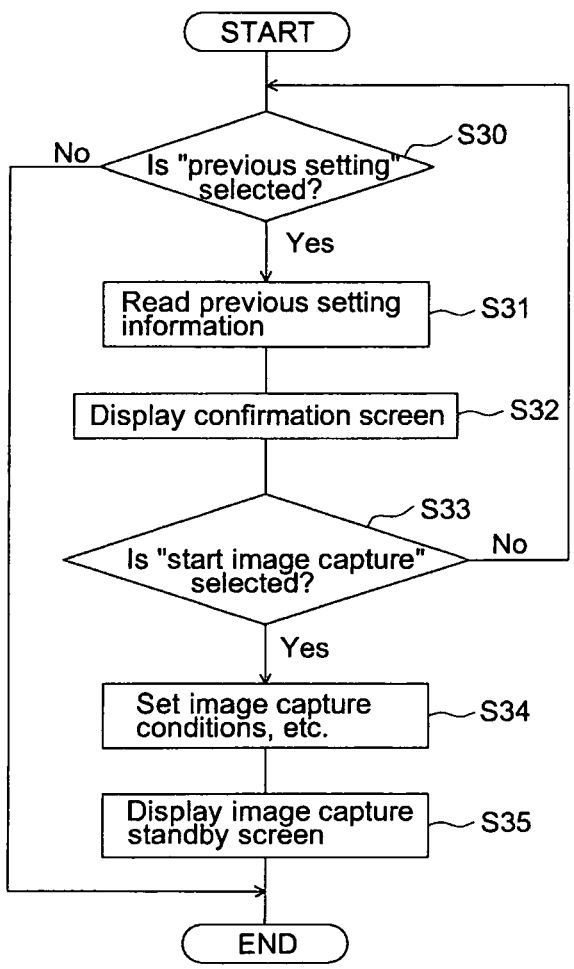
FIG. 12 is a flowchart explaining an operation when a previous setting is selected in the camera according to the embodiment.

Next, the operation of the control unit 26 while the presence display (the display for reading/the "previous setting" icon) is displayed when the camera 2 according to the embodiment has re-entered the guide mode will be described with reference to the flowchart illustrated in FIG. 12.

First, the control unit 26 determines whether a user has selected "previous setting" when the screen 33 illustrated in FIG. 11 is displayed on the rear liquid crystal panel 12 (step S30). If the user has selected "previous setting" in step S30 (step S30, Yes) and pressed the OK (decision) button 23, the control unit 26 reads the previous setting information stored in the storage unit 31 (step S31).

Figure 13:
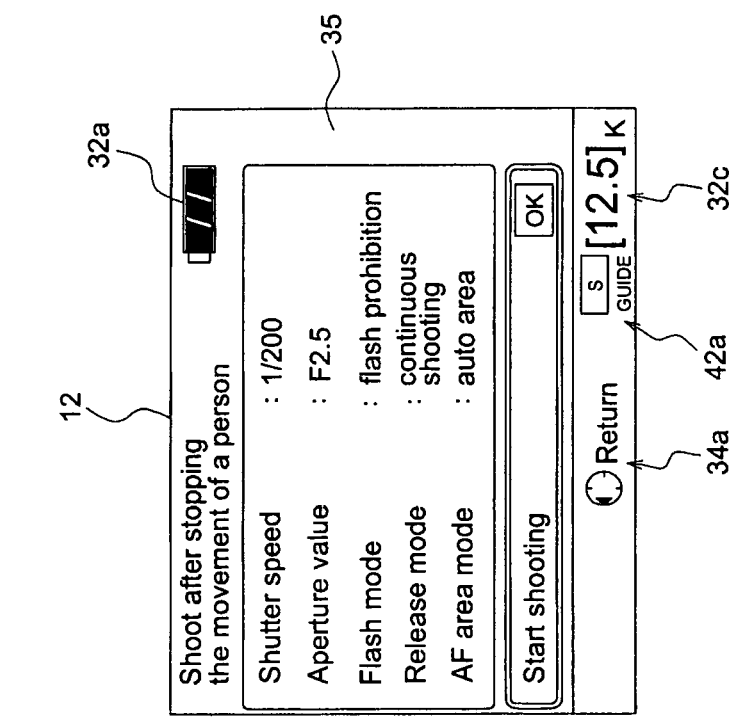
FIG. 13 is a diagram illustrating a display example of the rear liquid crystal panel according to the embodiment.

Then, the control unit 26 displays the previous setting information read from the storage unit 31 in step S31, and uses the rear liquid crystal panel 12 to display a confirmation screen for allowing the user to check the previous setting information. An example of a confirmation screen 35 is illustrated in FIG. 13 (step S32). The confirmation screen 35 displays previous setting information including a shutter speed, an aperture value, a flash mode, a release mode and an AF area mode, which are set in the guide mode and stored in the storage unit 31.

At this time, the previous setting information displayed on the confirmation screen 35 includes only setting information changed in the guide mode before the camera 2 is switched off may be displayed on the confirmation screen 35, or both the setting information changed in the guide mode before the camera 2 is placed in an off state and setting information preset as a default without change. Furthermore, only the setting information (the setting information set in "shoot" illustrated in FIG. 5) regarding the image capture may be displayed on the confirmation screen 35, or both the setting information regarding the image capture and the setting information (the setting information set in "set" illustrated in FIG. 5) regarding the camera 2 may be displayed on the confirmation screen 35.

When the user checks the previous setting information on the confirmation screen 35 and performs an image capture operation using the image capture conditions set based on the previous setting information, the user selects "start image capture" on the confirmation screen 35 and presses the OK (decision) button 23. In addition, when returning to the previous screen 33, the user presses the left button of the cross operation key 22 or the menu button 16.

If the left button of the cross operation key 22 or the menu button 16 is pressed by the user, the control unit 26 determines that "start image capture" has not been selected (step S33, No) and displays the screen 33 on the rear liquid crystal panel 12 as illustrated in FIG. 11. Then, the control unit 26 returns to the process of step S30 and repeats the processes of steps S30 to S33.

Meanwhile, if it is determined that "start image capture" has been selected (step S33, Yes) and then the OK (decision) button 23 is pressed by the user, the control unit 26 uses the previous setting information read from the storage unit 31 in step S31 to set image capture conditions (step S34). Then, the control unit 26 allows the rear liquid crystal panel 12 to display an image capture standby screen (not shown) on which a mark indicating whether an item has been set in the guide mode, a set shutter speed, an aperture value, an auto focus area, an image quality mode, an image size, white balance, ISO sensitivity, a light measurement mode and the like are displayed (step S35).

In addition, when the user has not selected "previous setting" in step S30 (step S30, No) and has selected any one of "shoot", "view/delete" and "set", the control unit 26 performs a setting regarding new image capture, reproduction, deletion or the camera 2 according to a setting operation of the user without reading the previous setting information from the storage unit 31.

In accordance with the camera 2 according to the first embodiment, the setting information regarding the image capture, the reproduction and the camera 2 set in the guide mode when the power of the camera 2 is turned off is stored in the storage unit 31 as previous setting information, and a reading display is displayed on the rear liquid crystal panel 12 when the power of the camera 2 is turned on within the predetermined time and re-enters the guide mode again. Consequently, if within the predetermined time, it is possible to read the previous setting information and easily and quickly perform a setting of image capture conditions based on the previous setting information, so that it is possible to quickly perform an image capture operation under the same image capture conditions as the image capture conditions based on the previous setting information. For example, in an athletic meet and the like, a user performs a setting regarding image capture in the guide mode and performs an image capture operation under the set image capture conditions in the morning, then turns off the power of the camera once at lunchtime, and turns the power of the camera on again in the afternoon to perform an image capture operation under image capture conditions that are the same as the image capture conditions set in the guide mode in the morning. When the conditions before the power of the camera 2 is turned off are the same as the conditions after the power of the camera 2 is turned on, it is not necessary to re-perform the same setting. Consequently when the power of the camera 2 is turned on and re-enters the guide mode, the camera can be easily and rapidly set to those image capture conditions that were set before the power of the camera 2 is turned off.

Next, a camera according to the second embodiment of the present invention will be described with reference to the appended drawings. Note that, since the camera according to the second embodiment has the same configuration as that of the camera 2 according to the first embodiment, the detailed description thereof will be omitted, and the operation of the camera according to the second embodiment will be described by adding the same reference numerals to the same elements as those in the configuration of the camera 2 illustrated in FIG. 4.

Figure 14:
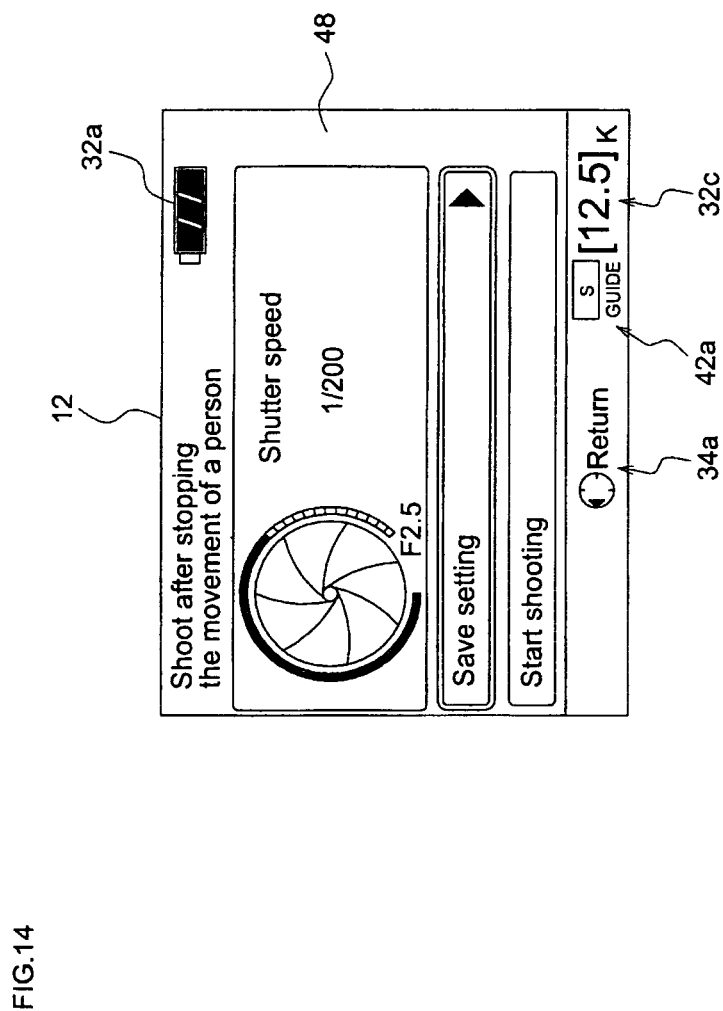
FIG. 14 is a diagram showing a display example of the rear liquid crystal panel according to a second embodiment.

In the camera according to the embodiment, a user can manually store previous setting information including setting information regarding the image capture, the reproduction and the camera set in the guide mode, in the storage unit 31. For example, in the same manner as that in the camera 2 according to the first embodiment, after "shoot" is selected in the guide mode (see FIG. 5), "shoot using a technique" is selected (see FIG. 6) and "shoot after stopping the movement of a person" is selected (see FIG. 7), if a shutter speed is set on a screen for setting the shutter speed and the OK (decision) button 23 is pressed by the user, the control unit 26 uses the rear liquid crystal panel 12 to display a screen 48 as illustrated in FIG. 14 instead of the screen 46 as illustrated in FIG. 8. In the case of saving the setting information such as the shutter speed set in the guide mode as previous setting information, the user selects "save a setting" on the screen 48 and presses the OK (decision) button 23. Then, the control unit 26 allows the previous setting information to be stored in the storage unit 31 according to an operation command of the user. In FIG. 14, the "save setting" is selected.

Figure 15:
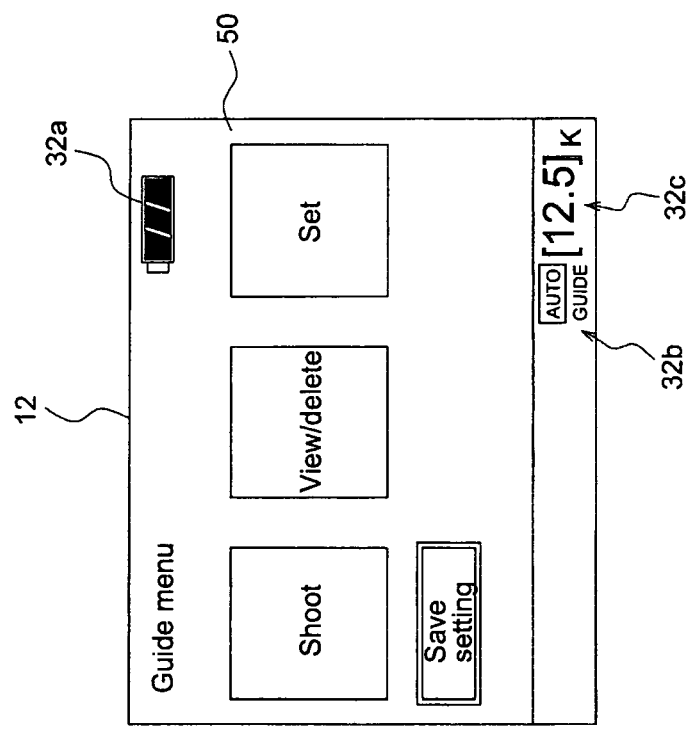
FIG. 15 is a diagram showing a display example of the rear liquid crystal panel according to the second embodiment.

Furthermore, after performing the setting regarding the image capture in the guide mode, when the guide mode is released once, the camera enters another mode and then re-enters the guide mode, or when the menu button 16 is pressed in the guide mode, the control unit 26 uses the rear liquid crystal panel 12 to display a screen 50 as illustrated in FIG. 15, instead of the screen 32 as illustrated in FIG. 5. When saving previous setting information such as setting information including the shutter speed set in the guide mode, the user selects "save setting" on the screen 50 and presses the OK (decision) button 23. Then, the control unit 26 allows the previous setting information to be stored in the storage unit 31 according to an operation command of the user. In FIG. 15, "save setting" is selected.

Figure 16:
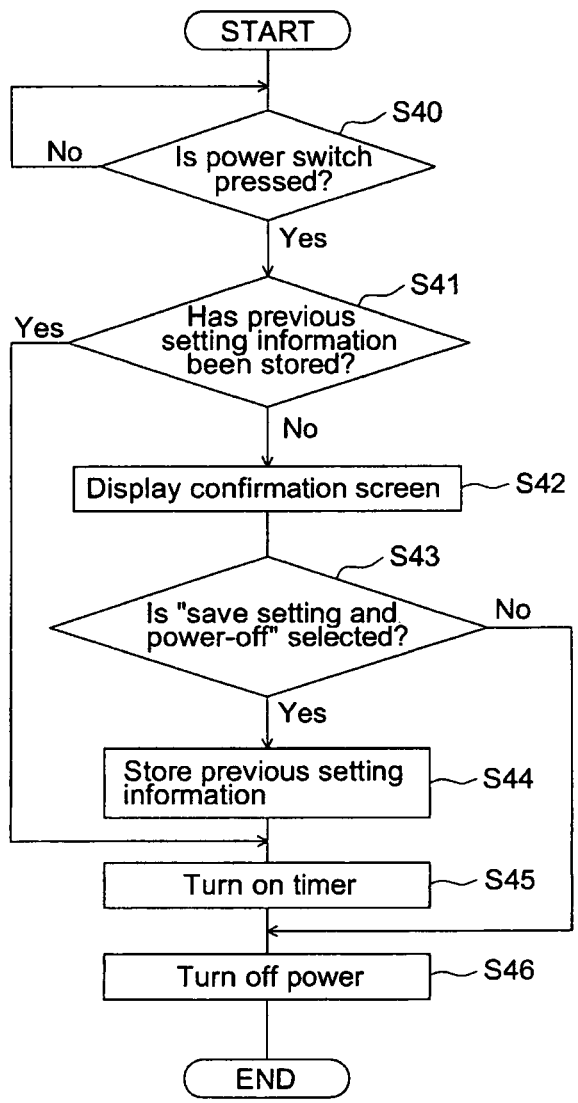
FIG. 16 is a flowchart explaining an operation during power off in a camera according to the second embodiment.

In addition, the camera according to the embodiment has a function of checking whether to save the previous setting information when the user does not save the previous setting information and turns off the power of the camera. Hereinafter, the operation of the control unit 26 when the camera according to the embodiment is switched off will be described with reference to the flowchart illustrated in FIG. 16.

First, when the operation position 10a of the mode dial 10 is selected, that is, the guide mode is set, if the power switch 4 for commanding the power-off of the camera is pressed by a user (step S40, Yes), the control unit 26 determines whether setting information (the latest setting information) regarding the image capture, the reproduction and the camera in the guide mode is already stored in the storage unit 31 as previous setting information (step S41).

That is, when the user stores the setting information regarding the image capture, the reproduction and the camera, which has been set in the guide mode, in the storage unit 31 as the previous setting information before pressing the power switch 4, the control unit 26 determines that the previous setting information is already stored in the storage unit 31 (step S41, Yes). Meanwhile, when the user does not store the previous setting information in the storage unit 31 before pressing the power switch 4, the control unit 26 determines that the previous setting information is not stored in the storage unit 31 (step S41, No).

Figure 17:
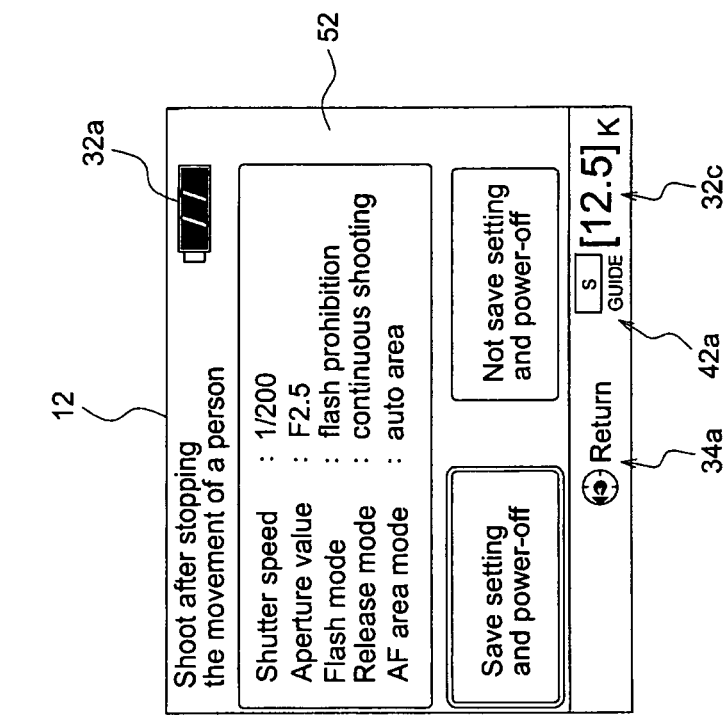
FIG. 17 is a diagram showing a display example of the rear liquid crystal panel according to the second embodiment.

When it is determined that the previous setting information is not stored in the storage unit 31 in step S41 (step S41, No), the control unit 26 allows the rear liquid crystal panel 12 to display a confirmation screen for checking whether to store the previous setting information in the storage unit 31, for example, a confirmation screen 52 as illustrated in FIG. 17 (step S42). The confirmation screen 52 displays previous setting information including a shutter speed, an aperture value, a flash mode, a release mode and an AF area mode, which have been set in the guide mode. The user selects "save setting and power-off" when turning off the power of the camera 2 after storing the previous setting information in the storage unit 31 or selects "leave setting and power-off" when turning off the power of the camera 2 without storing the previous setting information in the storage unit 31 by using the cross operation key 22 and the like. In FIG. 17, "save setting and power-off" is selected.

Next, the control unit 26 determines whether the user has selected "save setting and power-off" (step S43). If "save setting and power-off" is selected in step S43 (step S43, Yes) and the OK (decision) button 23 is pressed by the user, the control unit 26 allows the previous setting information to be stored in the storage unit 31 (step S44). Then, a timer is turned on (step S45) and simultaneously the power of the camera 2 is turned off (step S46). Since the processes of step S45 and step S46 are equal to those of step S12 and step S13 illustrated in FIG. 9, the detailed description thereof will be omitted. Furthermore, when it is determined that the previous setting information is already stored in the storage unit 31 in step S41 (step S41, Yes), the control unit 26 proceeds to the process of step S45 and performs the processes of step S45 and step S46.

Meanwhile, when it is determined that "save setting and power-off" is not selected by the user in step S43 (step S43, No), that is, the user selects "leave setting and power-off" and presses the OK (decision) button 23, the control unit 26 turns off the power of the camera 2 without storing the previous setting information in the storage unit 31 (step S46).

In addition, in the camera according to the second embodiment, since the operation of the control unit 26 when the camera is switched on and the operation of the control unit 26 when the presence display (the display for reading/the "previous setting" icon) is displayed when the camera 2 has re-entered the guide mode are equal to the operation (refer to the flowcharts illustrated in FIGS. 10 and 12) of the control unit 26 in the camera 2 according to the first embodiment, the detailed description thereof will be omitted.

In accordance with the camera according to the second embodiment, the previous setting information can be manually stored in the storage unit 31 by a user operation, and when the previous setting information is not stored in the storage unit 31 before the power of the camera is turned off, a confirmation screen for checking whether the power of the camera is turned off after saving a setting or the power of the camera 2 is turned off without saving a setting is displayed. Consequently, it is possible for a user to check that the previous setting information is not stored in the storage unit 31 with reference to the displayed confirmation screen.

Furthermore, it is possible to select whether to store the previous setting information in the storage unit 31 before turning off the power of the camera 2. Consequently, when the user wants to store the previous setting information in the storage unit 31, it is possible to prevent the power of the camera 2 from being turned off in the state where the previous setting information is not stored. Meanwhile, when the user does not want to store the previous setting information in the storage unit 31, it is possible to turn off the power of the camera 2 without storing the previous setting information. For example, when there is a plan to perform an image capture operation under the same image capture conditions within a predetermined time, the power of the camera 2 can be turned off after storing the previous setting information in the storage unit 31. Meanwhile, when there is no plan to perform an image capture operation under the same image capture conditions within the predetermined time, the power of the camera 2 can be turned off without storing the previous setting information in the storage unit 31.

In addition, in the second embodiment, when the camera does not re-enter the guide mode within the predetermined time after the guide mode is released (the camera is switched off), the presence display (the display for reading) is not displayed on the rear liquid crystal panel 12. However, since the previous setting information is manually stored by a user operation because a user determines that the previous setting information needs to be stored, the display for reading may be displayed on the rear liquid crystal panel 12 even after the predetermined time elapses and the previous setting information can be read at any time.

Figure 10:
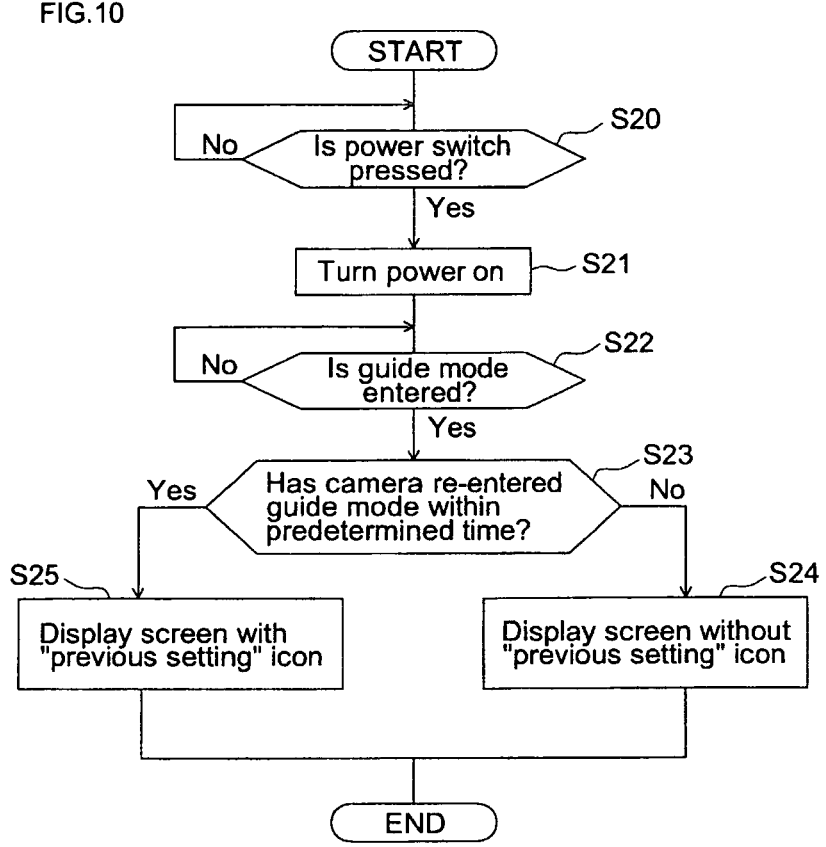
FIG. 10 is a flowchart explaining an operation during power on in the camera according to the embodiment.

Moreover, in each of the above-described embodiments, in step S24 illustrated in FIG. 10, the screen 32 (the screen on which the "previous setting" icon is not displayed) illustrated in FIG. 5 is displayed on the rear liquid crystal panel 12. However, a screen having the same configuration as that of the screen 33 illustrated in FIG. 11 may be displayed on the rear liquid crystal panel 12 as a non-selectable icon for the "previous setting" icon (e.g., gray-out display).

Furthermore, in each of the above-described embodiments, the predetermined time is preset to eight hours and configured to be changeable. However, the predetermined time may be set based on a time period for which the guide mode has been released. Specifically, in the case where the guide mode has been released in the time period (e.g., the time period of daytime) for which the surroundings are bright, the predetermined time may be set to a longer time, as compared to the case where the guide mode has been released in the time period (e.g., the time period of night) for which the surroundings are dark. In addition, the time (e.g., 10 hours until a date is changed when the guide mode has been released at 14:00 PM) from a time at which the guide mode has been released to a time at which a date is changed may be set as the predetermined time.

In addition, in each of the above-described embodiments, for the setting regarding the reproduction and the camera 2, the previous setting information is configured to be read even after the predetermined time elapses. However, similarly to the setting regarding the image capture, it may be possible to adopt a configuration in which the previous setting information cannot be read after the predetermined time elapses.

Moreover, a predetermined time in the case of storing the setting information regarding the image capture can be set to be different from a predetermined time in the case of storing the setting information regarding the reproduction and the camera 2. In such a case, the predetermined time (hereinafter, referred to as a first predetermined time) in the case of storing the setting information regarding the image capture may be set to be shorter than the predetermined time (hereinafter, referred to as a second predetermined time) in the case of storing the setting information regarding the reproduction and the camera 2.

As described above, when the predetermined time is set based on the time period for which the guide mode has been released, or when the first predetermined time is different from the second predetermined time, when the guide mode is released, it is preferable to display a notification screen for notifying information regarding the predetermined time on the rear liquid crystal panel 12. For example, the rear liquid crystal panel 12 displays a notification screen on which displays a message such as "setting information regarding image capture will be saved for the next eight hours" or "setting information regarding image capture will be saved for the next eight hours and setting information regarding reproduction and a camera will be saved for the next 36 hours". Specifically, in the first embodiment, before the power of the camera 2 is turned off after a user presses the power switch 4, the notification screen may be displayed. In the second embodiment, the above-described notification screen may be displayed after the confirmation screen 52 illustrated in FIG. 17 is displayed in step S42 illustrated in FIG. 16, or the confirmation screen 52 illustrated in FIG. 17, which includes a message for notifying information regarding the predetermined time added thereto, may be displayed.

Figure 18:
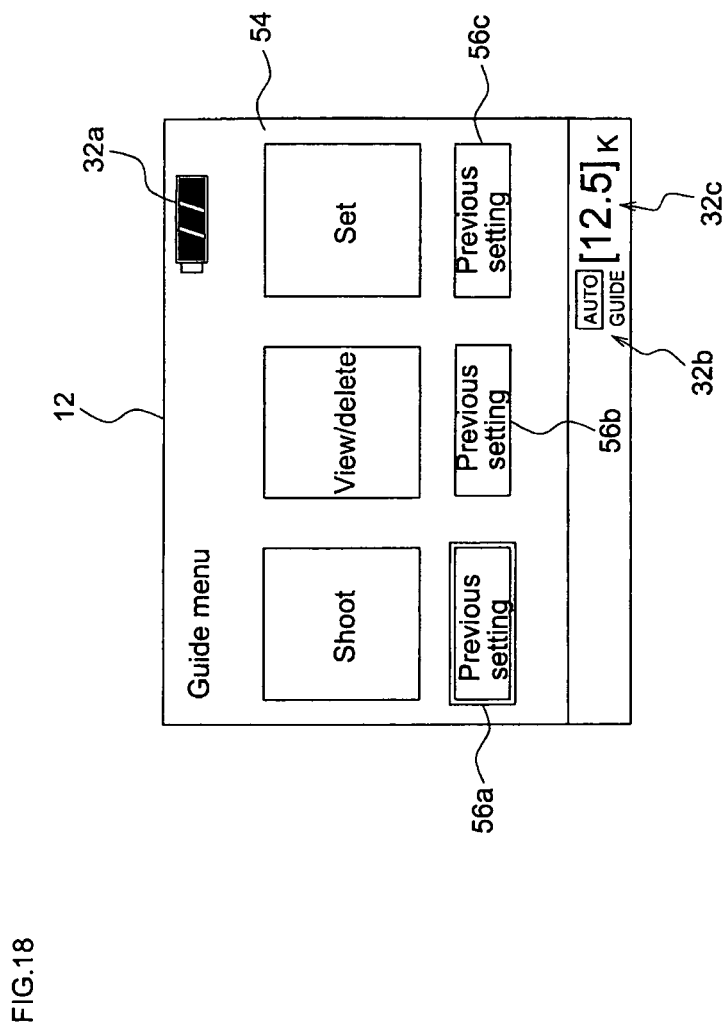
FIG. 18 is a diagram illustrating a display example of the rear liquid crystal panel according to the embodiment.

In addition, in each of the above-described embodiments, in step S25 illustrated in FIG. 10, the screen 33 illustrated in FIG. 11 is displayed on the rear liquid crystal panel 12. However, instead of the screen 33, for example, a screen 54 illustrated in FIG. 18 may be displayed on the rear liquid crystal panel 12. The screen 54 displays three "previous setting" icons 56a, 56b, and 56c. The "previous setting" icon 56a represents present display (display for reading for commanding the reading of previous setting information thereof) indicating the presence or absence of setting information regarding image capture, the "previous setting" icon 56b represents present display (display for reading for commanding the reading of previous setting information thereof) indicating the presence or absence of setting information regarding reproduction, and the "previous setting" icon 56c represents present display (display for reading for commanding the reading of previous setting information thereof) indicating the presence or absence of setting information regarding a camera. That is, when a user selects the "previous setting" icon 56a and presses the OK (decision) button 23, the control unit 26 reads only the previous setting information regarding the image capture from the storage unit 31, which is included in the previous setting information stored in the storage unit 31. Similarly to this, if a user selects the "previous setting" icon 56b (or 56c) and presses the OK (decision) button 23, the control unit 26 reads only the previous setting information regarding the reproduction (or the camera) from the storage unit 31. In such a case, it is possible to individually read the previous setting information regarding the image capture, the reproduction or the camera. Furthermore, it is possible to individually store the previous setting information regarding the image capture, the reproduction or the camera in the storage unit 31, and individually set a predetermined time for which the previous setting information is stored.

Moreover, in each of the above-described embodiments, when the power of the camera is turned off in the guide mode, the previous setting information is stored in the storage unit 31. However, even when the guide mode has been released when the power of the camera is turned on (when the camera 2 has entered another mode), the previous setting information is stored in the storage unit 31. In such a case, the predetermined time starts to be counted after the guide mode has been released (when the camera has entered another mode). Furthermore, when the power of the camera is turned on (the power of the camera is not turned off), when the camera has entered the guide mode again from another mode within the predetermined time, the presence display (the display for reading) is displayed. In addition, when the camera has been switched off without re-entering the guide mode from another mode (while the camera has been set to another mode), when the camera is switched on and enters the guide mode from another mode, the presence display (the display for reading) is displayed if the predetermined time does not elapse after time is counted.

Furthermore, in each of the above-described embodiments, all of the setting information regarding the image capture, the reproduction, and the camera, which have been set in the guide mode, are stored in the storage unit 31. However, at least one of the setting information regarding the image capture, the setting information regarding the reproduction and the setting information regarding the camera may be stored in the storage unit 31.

Furthermore, it is possible to configure a camera obtained by combining the camera according to the first embodiment with the camera according to the second embodiment. Specifically, it is possible to configure a camera in which a user can manually save previous setting information and previous setting information is automatically stored in the storage unit 31 when the guide mode is released. In such a case, an area of the storage unit 31 where the previous setting information is manually stored may be equal to or different from an area of the storage unit 31 where the previous setting information is automatically stored. When the two areas are the same, the latest previous setting information is stored in the storage unit 31 (is overwritten).

Figure 19:
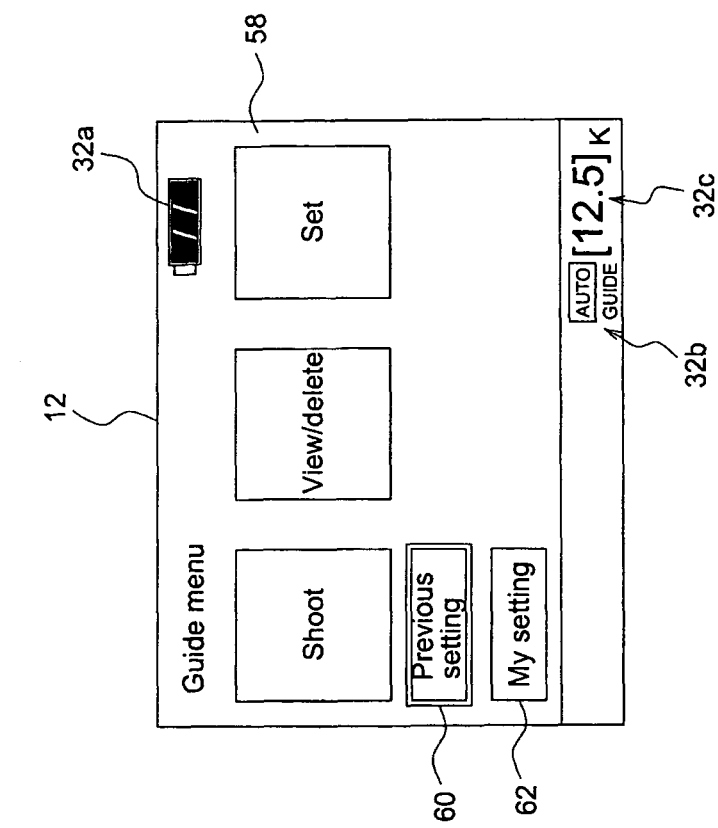
FIG. 19 is a diagram illustrating a display example of the rear liquid crystal panel according to the embodiment.

Meanwhile, when the two areas are different from each other, both the previous setting information (referred to as first setting information) manually stored by the user and the previous setting information (referred to as second setting information) automatically stored by the camera are saved. In such a case, in step S25 illustrated in FIG. 10, for example, a screen 58 illustrated in FIG. 19 is displayed on the rear liquid crystal panel 12, instead of the screen 33 illustrated in FIG. 11. The screen 58 displays a "previous setting" icon 60 and a "my setting" icon 62. The "previous setting" icon 60 represents display for reading for commanding the reading of the second setting information. The "my setting" icon 62 represents display for reading for commanding the reading of the first setting information. That is, when a user selects the "previous setting" icon 60 and presses the OK (decision) button 23, the control unit 26 reads the second setting information from the storage unit 31, which is stored in a predetermined area of the storage unit 31. Meanwhile, when a user selects the "my setting" icon 62 and presses the OK (decision) button 23, the control unit 26 reads the first setting information from the storage unit 31, which is stored in an area different from the predetermined area of the storage unit 31.

Moreover, it may be possible to adopt a configuration in which two or more pieces of first setting information are stored. In such a case, in step S25 illustrated in FIG. 10, the rear liquid crystal panel 12 is allowed to display a screen on which icons including "previous setting", "my setting 1" and "my setting 2" in addition to "shoot", "view/delete" and "set" are displayed, instead of the screen 58 illustrated in FIG. 19. When a user selects "previous setting" and presses the OK (decision) button 23, the control unit 26 reads the second setting information from the storage unit 31, which is stored in a predetermined area of the storage unit 31. Meanwhile, when a user selects "my setting 1", the control unit 26 reads one first setting information from the storage unit 31, which is stored in a first area different from the predetermined area of the storage unit 31. When a user selects "my setting 2", the control unit 26 reads the other first setting information from the storage unit 31, which is stored in a second area different from the predetermined area and the first area of the storage unit 31. In addition, the first setting information may be read even after the predetermined time elapses.

The embodiments explained above have been described so that the present invention is understood more easily, and are not intended to limit the present invention. Therefore, the respective elements, which are disclosed in the respective embodiments described above, also include all of modifications of design and equivalents belonging to the technical scope of the present invention.

The invention claimed is:

1. An imaging device provided with an imaging unit for imaging object light, and a display unit for displaying an image, comprising:
   a storage unit that stores at least one of setting information regarding image capture performed in a predetermined image capture mode in which a predetermined image capture condition can be set and setting information regarding functions other than the image capture; and
   a control unit that i) determines whether a predetermined condition is satisfied when the predetermined image capture mode is released and then the imaging device re-enters the predetermined image capture mode and ii) controls whether to cause the display unit to display presence display, which indicates presence or absence of the setting information stored in the storage unit, based on the determination result, wherein the control unit determines that the predetermined condition is satisfied when the setting information is stored in the storage unit as a result of an external operation for storing the setting information in the storage unit being performed by a user, and the control unit displays the presence display on the display unit when the predetermined condition is satisfied.

2. The imaging device according to claim 1, wherein the predetermined image capture mode is a guide mode where a setting regarding image capture is performed while displaying guidance menus for encouraging a user to select operations on the display unit in accordance with a purpose of the image capture selected by the user.

3. The imaging device according to claim 1, wherein, when the presence display displayed on the display unit is selected, the control unit reads the setting information stored in the storage unit.

4. An imaging device provided with an imaging unit for imaging object light, and a display unit for displaying an image, comprising:
 a storage unit that stores at least one of setting information regarding image capture performed in a predetermined image capture mode in which a predetermined image capture condition can be set and setting information regarding functions other than the image capture; and
 a control unit that (i) determines whether a predetermined condition is satisfied when the predetermined image capture mode is released and then the imaging device re-enters the predetermined image capture mode and (ii) controls whether to cause the display unit to display presence display, which indicates presence or absence of the setting information stored in the storage unit, based on the determination result, wherein
 the control unit (a) determines that the predetermined condition is satisfied when the predetermined image capture mode is released and then the imaging device re-enters the predetermined image capture mode within a predetermined time, the predetermined time being set based on a time zone of a day when the predetermined image capture mode is released, and (b) displays the presence display on the display unit when the predetermined condition is satisfied.

5. The imaging device according to claim 4, wherein the predetermined time is set to a time from a time at which the predetermined image capture mode has been released to a time at which a date is changed.

6. The imaging device according to claim 4, wherein the predetermined time differs depending on whether the setting information regarding image capture is stored or the setting information regarding the functions other than the image capture is stored.

7. The imaging device according to claim 4, when at least one other predetermined time is set in addition to the predetermined time, the control unit notifies information regarding the predetermined time and the other predetermined time when the predetermined image capture mode is released.

* * * * *